United States Patent
Wang et al.

(10) Patent No.: US 11,328,731 B2
(45) Date of Patent: May 10, 2022

(54) PHONE-BASED SUB-WORD UNITS FOR END-TO-END SPEECH RECOGNITION

(71) Applicant: salesforce.com, inc., San Francisco, CA (US)

(72) Inventors: Weiran Wang, Palo Alto, CA (US); Yingbo Zhou, Mountain View, CA (US); Caiming Xiong, Menlo Park, CA (US)

(73) Assignee: salesforce.com, inc., San Francisco, CA (US)

( * ) Notice: Subject to any disclaimer, the term of this patent is extended or adjusted under 35 U.S.C. 154(b) by 148 days.

(21) Appl. No.: 16/903,964

(22) Filed: Jun. 17, 2020

(65) Prior Publication Data

US 2021/0319796 A1    Oct. 14, 2021

Related U.S. Application Data

(60) Provisional application No. 63/007,054, filed on Apr. 8, 2020.

(51) Int. Cl.
*G10L 15/26* (2006.01)

(52) U.S. Cl.
CPC .................................. *G10L 15/26* (2013.01)

(58) Field of Classification Search
CPC ....................................................... G10L 15/26
See application file for complete search history.

(56) References Cited

U.S. PATENT DOCUMENTS

| | | | |
|---|---|---|---|
| 10,282,663 B2 | 5/2019 | Socher et al. | |
| 10,346,721 B2 | 7/2019 | Albright et al. | |
| 10,474,709 B2 | 11/2019 | Paulus | |
| 10,521,465 B2 | 12/2019 | Paulus | |
| 10,542,270 B2 | 1/2020 | Zhou et al. | |
| 10,546,217 B2 | 1/2020 | Albright et al. | |
| 10,558,750 B2 | 2/2020 | Lu et al. | |
| 10,565,305 B2 | 2/2020 | Lu et al. | |
| 10,565,306 B2 | 2/2020 | Lu et al. | |
| 10,565,318 B2 | 2/2020 | Bradbury | |
| 10,565,493 B2 | 2/2020 | Merity et al. | |

(Continued)

OTHER PUBLICATIONS

Drexler et al., "Subword Regularization and Beam Search Decoding for End-to-End Automatic Speech Recognition," in ICASSP, pp. 6266-6270, 2019.

(Continued)

*Primary Examiner* — Ibrahim Siddo
(74) *Attorney, Agent, or Firm* — Haynes and Boone, LLP (57) ABSTRACT

System and methods for identifying a text word from a spoken utterance are provided. An ensemble BPE system that includes a phone BPE system and a character BPE system receives a spoken utterance. Both BPE systems include a multi-level language model (LM) and an acoustic model. The phone BPE system identifies first words from the spoken utterance and determine a first score for each first word. The first words are converted into character sequences. The character BPE model converts the character sequences into second words and determines a second score for each second word. For each word from the first words that matches a word in the second words the first and second scores are combined. The text word is the word with a highest score.

20 Claims, 6 Drawing Sheets

(56) References Cited

U.S. PATENT DOCUMENTS

| | | | |
|---|---|---|---|
| 10,573,295 B2 | 2/2020 | Zhou et al. | |
| 10,592,767 B2 | 3/2020 | Trott et al. | |
| 10,699,060 B2 | 6/2020 | Mccann et al. | |
| 10,776,581 B2 | 9/2020 | Mccann et al. | |
| 10,783,875 B2 | 9/2020 | Hosseini-Asl et al. | |
| 10,817,650 B2 | 10/2020 | Mccann et al. | |
| 10,839,284 B2 | 11/2020 | Hashimoto et al. | |
| 10,846,478 B2 | 11/2020 | Lu et al. | |
| 2005/0060151 A1* | 3/2005 | Kuo | G10L 13/06 704/240 |
| 2016/0004691 A1* | 1/2016 | Cao | G06F 40/44 704/4 |
| 2016/0350653 A1 | 12/2016 | Socher et al. | |
| 2017/0024645 A1 | 1/2017 | Socher et al. | |
| 2017/0032280 A1 | 2/2017 | Socher | |
| 2017/0140240 A1 | 5/2017 | Socher et al. | |
| 2018/0096219 A1 | 4/2018 | Socher | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0268287 A1 | 9/2018 | Johansen et al. | |
| 2018/0268298 A1 | 9/2018 | Johansen et al. | |
| 2018/0336453 A1 | 11/2018 | Merity et al. | |
| 2018/0373987 A1 | 12/2018 | Zhang et al. | |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0188568 A1 | 6/2019 | Keskar et al. | |
| 2019/0213482 A1 | 7/2019 | Socher et al. | |
| 2019/0251431 A1 | 8/2019 | Keskar et al. | |
| 2019/0258714 A1 | 8/2019 | Zhong et al. | |
| 2019/0258939 A1 | 8/2019 | Min et al. | |
| 2019/0286073 A1 | 9/2019 | Asl et al. | |
| 2019/0355270 A1 | 11/2019 | Mccann et al. | |
| 2019/0362020 A1 | 11/2019 | Paulus et al. | |
| 2019/0362246 A1 | 11/2019 | Lin et al. | |
| 2020/0005765 A1 | 1/2020 | Zhou et al. | |
| 2020/0065651 A1 | 2/2020 | Merity et al. | |
| 2020/0084465 A1 | 3/2020 | Zhou et al. | |
| 2020/0089757 A1 | 3/2020 | Machado et al. | |
| 2020/0090033 A1 | 3/2020 | Ramachandran et al. | |
| 2020/0090034 A1 | 3/2020 | Ramachandran et al. | |
| 2020/0103911 A1 | 4/2020 | Ma et al. | |
| 2020/0104643 A1 | 4/2020 | Hu et al. | |
| 2020/0104699 A1 | 4/2020 | Zhou et al. | |
| 2020/0105272 A1 | 4/2020 | Wu et al. | |
| 2020/0117854 A1 | 4/2020 | Lu et al. | |
| 2020/0117861 A1 | 4/2020 | Bradbury | |
| 2020/0142917 A1 | 5/2020 | Paulus | |
| 2020/0175305 A1 | 6/2020 | Trott et al. | |
| 2020/0184020 A1 | 6/2020 | Hashimoto et al. | |
| 2020/0234113 A1 | 7/2020 | Liu | |
| 2020/0272940 A1 | 8/2020 | Sun et al. | |
| 2020/0285704 A1 | 9/2020 | Rajani et al. | |
| 2020/0285705 A1 | 9/2020 | Zheng et al. | |
| 2020/0285706 A1 | 9/2020 | Singh et al. | |
| 2020/0285993 A1 | 9/2020 | Liu et al. | |
| 2020/0301925 A1 | 9/2020 | Zhong et al. | |
| 2020/0302178 A1 | 9/2020 | Gao et al. | |
| 2020/0302236 A1 | 9/2020 | Gao et al. | |
| 2020/0334334 A1 | 10/2020 | Keskar et al. | |
| 2020/0364299 A1 | 11/2020 | Niu et al. | |
| 2020/0364542 A1 | 11/2020 | Sun | |
| 2020/0372116 A1 | 11/2020 | Gao et al. | |
| 2020/0372319 A1 | 11/2020 | Sun et al. | |
| 2020/0372339 A1 | 11/2020 | Che et al. | |
| 2020/0372341 A1 | 11/2020 | Asai et al. | |
| 2020/0380213 A1 | 12/2020 | Mccann et al. | |

OTHER PUBLICATIONS

Povey et al., "The Kaldi Speech Recognition Toolkit," in ASRU, pp. 1-4, 2011.

Sennrich et al. "Neural Machine Translation of Rare Words with Subword Units," in Proceedings of the 54th Annual Meeting of the Association for Computational Linguistics, pp. 1715-1725, 2016.

Schuster et al., "Japanese and Korean Voice Search," in ICASSP, pp. 5149-5152, 2012.

Graves, "Towards End-to-End Speech Recognition with Recurrent Neural Networks," in ICML, pp. 1-9, 2014.

Gowayyed et al., "EESEN: End-to-End Speech Recognition using Deep RNN Models and WFST-Based Decoding," in ASRU, pp. 1-8, 2015.

Sak et al., "Fast and Accurate Recurrent Neural Network Acoustic Models for Speech Recognition," INTERSPEECH, pp. 1468-1472, 2015.

Amodei et al., "Deep Speech 2: End-to-End Speech Recognition in English and Mandarin," in Proceedings of the 33rd International Conference on Machine Learning, New York, NY, USA, pp. 1-10, 2016.

Collobert et al., "Wav2Letter: An End-to-End ConvNet-based Speech Recognition System," arXiv:1609.03193 [cs.LG], pp. 1-8, 2016.

Chan et al., "Listen, Attend and Spell: A Neural Network for Large Vocabulary Conversational Speech Recognition," in ICASSP, pp. 4960-4964, 2016.

Watanabe et al., "ESPnet: End-to-End Speech Processing Toolkit," INTERSPEECH, 2207-2211, 2018.

Zeyer et al., "Improved Training of End-to-End Attention Models for Speech Recognition," in Interspeech, pp. 1-5, 2018.

He et al., "Streaming End-to-End Speech Recognition for Mobile Devices," in ICASSP, pp. 1-5, 2019.

Wang et al., "Espresso: A Fast End-to-End Neural Speech Recognition Toolkit," arXiv:1909.08723v1 to appear in ASRU, pp. 1-8, 2019.

Young et al., "Tree-Based State Tying for High Accuracy Acoustic Modelling," in Proceedings of the Workshop on Human Language Technology, pp. 307-312, 1994.

Miao et al., "An Empirical Exploration of CTC Acoustic Models," in ICASSP, pp. 1-5, 2016.

Zweig et al., "Advances In All-Neural Speech Recognition," arXiv: 1609.05935v2 and in ICASSP, pp. 1-5, 2017.

Kudo, "Subword Regularization: Improving Neural Network Translation Models with Multiple Subword Candidates," Proceedings of the 56th Annual Meeting of the Association for Computational Linguistics, pp. 66-75, 2018.

Watanabe et al., "Hybrid CTC/Attention Architecture for End-to-End Speech Recognition," IEEE Journal of Selected Topics in Signal Processing, No. 8, pp. 1240-1253, 2017.

The CMU pronouncing dictionary,"http://www.speech.cs.cmu.edu/cgi-bin/cmudict," pp. 1-2, retrieved Jan. 1, 2021.

Bisani et al.,"Joint-Sequence Models for Grapheme-to-Phoneme Conversion," Speech Communication, vol. 50, No. 5, pp. 434-451, 2008.

Rao et al., "Grapheme-to-Phoneme Conversion Using Long Short-Term Memory Recurrent Neural Networks," in ICASSP, pp. 1-5, 2015.

Yolchuyeva et al., "Transformer Based Grapheme-to-Phoneme Conversion," in Interspeech, pp. 2095-2099, 2019.

Gulcehre et al., "On Using Monolingual Corpora in Neural Machine Translation," arXiv:1503.03535 [cs.CL], pp. 1-9, 2015.

Hori et al., "Multi-Level Language Modeling and Decoding for Open Vocabulary End-to-End Speech Recognition," ASRU, pp. 1-7, 2017.

Rao et al., "Multi-Accent Speech Recognition with Hierarchical Grapheme Based Models," in ICASSP, pp. 4815-4819, 2017.

Toshniwal et al., "Multitask Learning with Low-Level Auxiliary Tasks for Encoder-Decoder Based Speech Recognition," Interspeech, pp. 1-5, 2017.

Rao et al., "Exploring Architectures, Data and Units for Streaming End-to-End Speech Recognition with RNN-Transducer," arXiv:1801.00841v1 [cs.CL] pp. 1-7, 2018.

Yu et al., "A Multistage Training Framework for Acoustic-to-Word Model," Interspeech, pp. 1-5, 2018.

(56) References Cited

OTHER PUBLICATIONS

Vaswani et al., "Attention is All you Need," 31st Conference on Neural Information Processing Systems, pp. 1-11, 2017.
Karita et al., "A Comparative Study on Transformer vs RNN in Speech Applications," in ASRU, pp. 1-10, 2019.
Park et al., "SpecAugment: A Simple Data Augmentation Method for Automatic Speech Recognition," Interspeech, pp. 2613-2617, 2019.
Kingma et al., "Adam: A method for stochastic optimization," in ICLR, pp. 1-15, 2015.
Paul et al., "The Design for the Wall Street Journal-Based CSR Corpus," Proceedings of the workshop on Speech and Natural Language, pp. 1-6, 1992.
"G2p-seq2seq," https://github.com/cmusphinx/g2p-seq2seq, pp. 1-4, 2019.
Baskar et al. "Promising Accurate Prefix Boosting for Sequence-to-Sequence ASR," in ICASSP, pp. 1-5, 2019.
Godfrey et al., "Switchboard: Telephone Speech Corpus for Research and Development," in ICASSP, pp. I-517-I-520, 1992.
Cui et al., "Improving Attention-Based End-to-End ASR Systems with Sequence-Based Loss Functions," in SLT, pp. 353-360, 2018.
Zeyer et al., "A Comprehensive Analysis on Attention Models," in Proc. IRASL Workshop, NeurIPS, pp. 1-12, 2018.

\* cited by examiner

FIG. 1

```
Algorithm 1 The forwarding function of multi-level RNNLM
Input: subword s, previous state state. Wlogp(w) gives
    the score at position w of vector Wlogp. Function
    node.getWords() returns the list of complete words asso-
    ciated with node of prefix tree T, node.getTokens() re-
    turns the list of subwords branching out from node, and
    node.branch(s) returns the new node after accepting s at
    node. α is used for weighing scores of S versus W
(Sstate, Slogp, Wstate, Wlogp, node, accum) ← state
if s.startswith('_') and (not node == root) then
    # Word boundary is met, inter-word transition
    if node.getWords() is not empty then
        wordlist ← node.getWords()
    else
        wordlist ← [<unk>]
    end if
    output ← []    (empty list)
    for w in wordlist do
        if w == <unk> then
            adjust ← Wlogp(<unk>) + oov_penalty
        else
            adjust ← Wlogp(w) - accum
        end if
        # Update word LM state
        (Wstate_new, Wlogp_new) ← W.forward(Wstate, w)
        accum_new ← α · Slogp(s),   node_new ← root.branch(s)
        # Update subword LM state
        (Sstate_new, Slogp_new) ← S.forward(Sstate, s)
        la_scores_new ← adjust + α · Slogp_new
        state_new ← (Sstate_new, Slogp_new, Wstate_new,
                     Wlogp_new, node_new, accum_new)
        output.append((state_new, la_scores_new, w))
    end for
    return output
else
    # Intra-word transition, no word output
    w ← <incomplete>
    if s in node.getTokens() then
        node ← node.branch(s)
        accum ← accum + α · Slogp(s)
        (Sstate, Slogp) ← S.forward(Sstate, s)
        la_scores ← α · Slogp
    else
        la_scores ← -∞    (vector of all -∞'s)
    end if
    state ← (Sstate, Slogp, Wstate, Wlogp, node, accum)
    return [(state, la_scores, w)]
end if
```

FIG. 2

```
Algorithm 2 Beam search algorithm for joint BPE system.
Input: Input x, trained models, and parameters (β, γ).
  top(sc, bs) return the list of (score, subword)-tuples of
  the bs highest values in vector sc. prune(H, bs) returns
  the bs highest scoring beams (in the score field) from H.
  finish(beam) forwards both systems to accept <eos> and
  the final output words), and compute final score as in (*).

H ← {(0.0, [<sos>], 0.0, [<sos>], init_st1,
              0.0, [<sos>], init_st2)}
C ← []     (set of completed beams)
while end_detection(C) == false do
  T ← []
  for beam in H do
    (score, ws, sc1, ys1, st1, sc2, ys2, st2) ← beam
    lm1_output ← LM1.forward(st1, ys1[-1])
    for (st1_n, la1, w) in lm1_output do
      yscores1 ← AM1.score(x, ys1) + β · la1
      sc2_n ← sc2,  ys2_n ← ys2,  st2_n ← st2
      if not w == <incomplete> then
        # Word boundary, forward Model2
        Δ ← spm_encode(w)
        for y in Δ do
          (st2_n, la2, _) ← LM2.forward(st2_n, ys2_n[-1])
          sc2_n ← sc2_n + AM2.score(x, ys2_n)(y) + β · la2(y)
          ys2_n.append(y)
        end for
      end if
      for (c, y) in top(yscores1, beamsize) do
        ws_n ← ws,  sc1_n ← sc1 + c,  ys1_n.append(y)
        if not w == <incomplete> then
          # Incorporate Model2 score at word boundary
          score_n ← (1 − γ) · sc1 + γ · sc2_n + c   (*)
          ws_n.append(w)
        else
          # Otherwise update score with Model1 only
          score_n ← score + c
        end if
        T.append((score_n, ws_n, sc1_n, ys1_n,
                  st1_n, sc2_n, ys2_n, st2_n))
      end for
    end for
  end for
  H ← prune(T, beamsize)
  for beam in H do
    if beam.ys1[-1] == <eos> then
      C.append(finish(beam))
    end if
  end for
end while
```

Table 1: *Dev WERs (%) of BPE systems with different number of units k for WSJ. LM weights ($\alpha$, $\beta$) are given in parenthesis.*

| Systems | k=75 | 100 | 150 | 250 | 500 | 1000 |
|---|---|---|---|---|---|---|
| Char BPE Subword ($\beta = 0.8$) | 9.6 | 9.8 | 10.3 | 10.9 | 11.2 | 12.0 |
| Char BPE Multi-level (0.6, 1.0) | 7.4 | 7.5 | 8.3 | 9.0 | 9.1 | 10.1 |
| Phone BPE Multi-level (0.6, 1.0) | 6.2 | 6.5 | 7.0 | 7.6 | 8.3 | 9.1 |

FIG. 5

Table 4: WERs (%) of BPE systems on eval2000 and RT-03.

| Modeling units | eval2000 | | RT03 |
|---|---|---|---|
| | SWBD | CALLHM | |
| Char + sMBR [39] | 12.0 | 23.1 | |
| Char BPE [40] | 11.0 | 23.1 | |
| SentencePiece [14] | 9.2 | 19.1 | |
| WordPiece [35] | 6.8 | 14.1 | |
| Ours: Stoc. layers (0.5), $\alpha$=0 | | | |
| Char BPE (Subword, $\beta$=0.2) | 7.0 | 14.5 | 12.8 |
| Phone BPE (Multi, $\beta$=0.4) | 6.8 | 14.4 | 12.3 |
| Joint ($\beta$=0.4, $\gamma$=0.4) | 6.3 | 13.3 | 11.4 |
| + Fisher: Stoc. layers (0.2) | | | |
| Char BPE (Subword, $\beta$=0.1) | 5.1 | 9.5 | 8.5 |
| Phone BPE (Multi, $\beta$=0.2) | 5.5 | 10.4 | 9.4 |
| Joint ($\beta$=0.2, $\gamma$=0.4) | 4.9 | 9.5 | |

FIG. 6

PHONE-BASED SUB-WORD UNITS FOR END-TO-END SPEECH RECOGNITION

RELATED APPLICATION

This application claims priority to U.S. Provisional Patent Application No. 63/007,054, filed Apr. 8, 2020, which is incorporated by reference herein in its entirety.

TECHNICAL FIELD

The embodiments are generally directed to end-to-end speech recognition systems, and more specifically to an ensemble end-to-end speech recognition system that includes a phone byte pair encoding system and a character byte pair encoding system implemented as neural networks.

BACKGROUND

Phones and the context-dependent variants have long been standard modeling units for conventional speech recognition systems. However, the modern end-to-end systems are beginning to use character and character based sub-words, such as byte pair encoder (BPE) and word pieces, for automatic speech recognition. Accordingly, what is needed are techniques that improve accuracy and optimize the automatic speech recognition systems that use a BPE.

BRIEF DESCRIPTION OF THE DRAWINGS

FIG. 2 is a forward function algorithm in a multi-level machine learning model, according to some embodiments.

FIG. 3 is a one-pass beam search decoder algorithm for converting a spoken utterance into a textual representation of a word, according to some embodiments.

DETAILED DESCRIPTION

The embodiments herein describe an ensemble byte pair encoder (BPE) system that includes a phone BPE system and a character BPE system. The ensemble BPE system models end-to-end speech recognition.

The embodiments describe a multi-level language model (LM) that includes a sub-word LM and a word LM for decoding words in a phone BPE system and a character BPE system. The multi-level LM may be a reoccurring neural network. The LM may include a prefix tree for identifying one or more words.

The embodiments describe an acoustic model in the phone BPE. The acoustic model may be represented as a neural network. The acoustic model may be trained using phone BPE targets. The training may be with the multi-task attention and Connectionist Temporal Classification (CTC) loss.

The embodiments describe a decoder which may convert the phone BPE sequence into words. The decoder may use a one-pass beam search decoder algorithm that efficiently ensembles both phone and character BPE systems in real-time and exploits the complementarity between the phone and character BPE systems.

Figure 1:
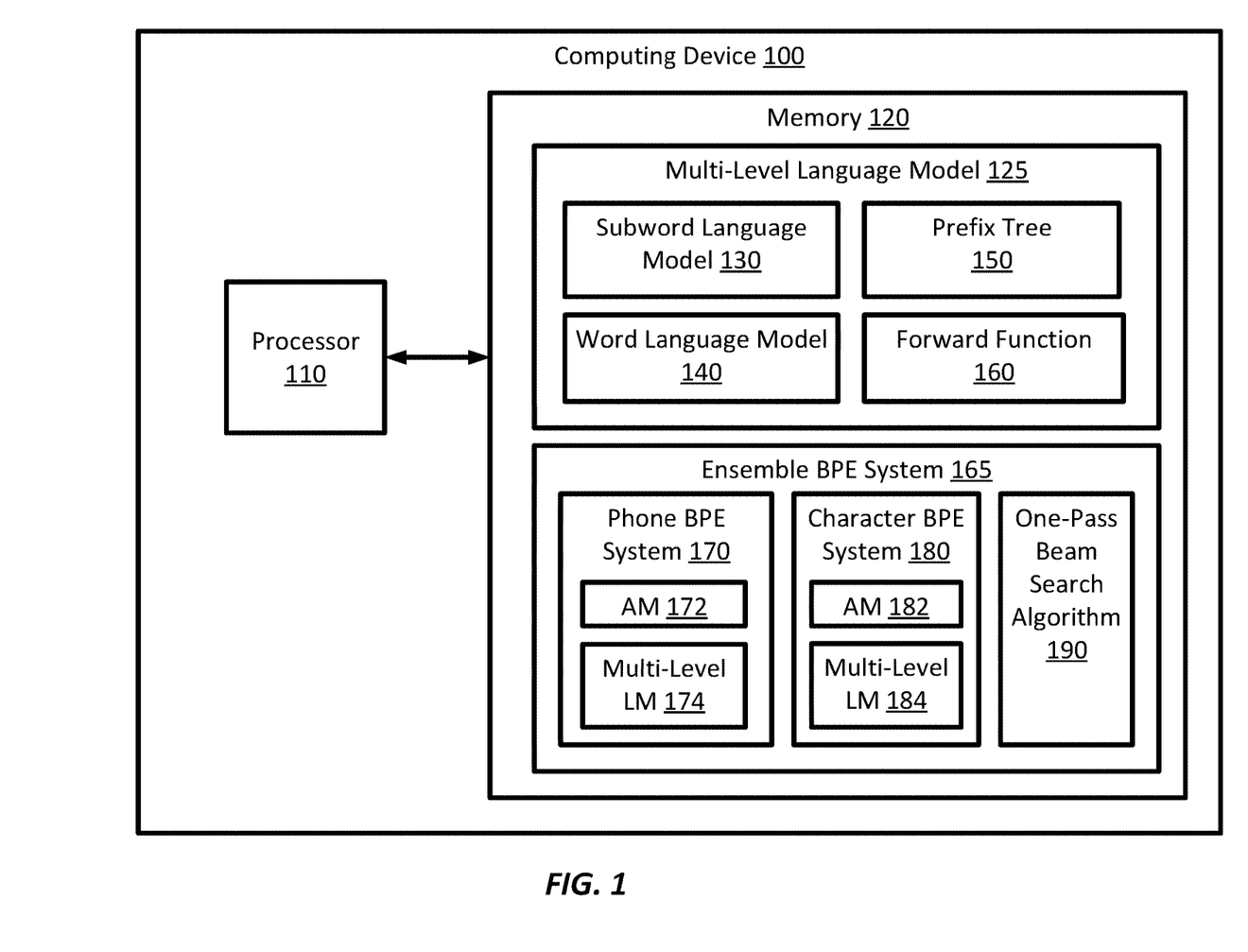
FIG. 1 is a simplified diagram of a computing device for implementing an ensemble byte pair encoding speech recognition system, according to some embodiments.

FIG. 1 is a simplified diagram of a computing device 100 for implementing an end-to-end speech recognition system, according to some embodiments. As shown in FIG. 1, computing device 100 includes a processor 110 coupled to a memory 120. Operation of computing device 100 is controlled by processor 110. And although computing device 100 is shown with only one processor 110, it is understood that processor 110 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 100. Computing device 100 may be implemented as a stand-alone subsystem, as a board added to a computing device, and/or as a virtual machine.

Memory 120 may be used to store software executed by computing device 100 and/or one or more data structures used during operation of computing device 100. Memory 120 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 110 and/or memory 120 may be arranged in any suitable physical arrangement. In some embodiments, processor 110 and/or memory 120 may be implemented on a same board, in a same package (e.g., system-in-package), on a same chip (e.g., system-on-chip), and/or the like. In some embodiments, processor 110 and/or memory 120 may include distributed, virtualized, and/or containerized computing resources. Consistent with such embodiments, processor 110 and/or memory 120 may be located in one or more data centers and/or cloud computing facilities.

In some embodiments, memory 120 may include non-transitory, tangible, machine readable media that includes executable code that when run by one or more processors (e.g., processor 110) may cause the one or more processors to perform the methods described in further detail herein. For example, as shown, memory 120 includes instructions for a multi-level language model (LM) 125 and ensemble BPE system 165. Multi-level LM 125 may receive an utterance, e.g. a spoken word or words in a natural language and convert the utterance into text that includes one or more textual representations of the word or words. In some embodiments multi-level LM 125 includes a sub-word LM 130 and a word LM 140. In some embodiments, sub-word LM 130 may build a word from one or more sequences of characters or sub-words, while word LM 140 may predict probability of a word given a sequence. Both sub-word LM 130 and word LM 140 may generate one or more scores for a word. Multi-level LM 125 may combine scores from sub-word LM 130 and word LM 140 and use the combined scores to determine a word. Multi-level LM 125, sub-word LM 130 and word LM 140 may be "networks" that may comprise any hardware or software-based framework that includes any artificial intelligence network or system, neural network or system and/or any training or learning models implemented thereon or therewith. Further, the multi-level LM 125, sub-word LM 130 and word LM 140 may each be at least one recurrent neural network.

In some embodiments, multi-level LM 125 may build a prefix tree 150. The prefix tree 150 may be stored in memory 120. The prefix tree 150 may store the pronunciation of characters, sub-words and words in a word dictionary. The prefix tree 150 may be built by decomposing the pronunciation of each word in a word dictionary into a phone sequence using a BPE decoding algorithm. The decomposition may be greedy because the BPE decoding algorithm may use large sub-words when possible. Typically, the prefix tree 150 may be built once using existing word dictionary that is converted into phone sequence and then stored in memory 120. Once prefix tree 150 is built, multi-level LM 125 may use prefix tree 150 to identify words.

When the multi-level LM 125 receives an utterance or spoken words, the multi-level LM 125 may attempt to convert the spoken words into text words using a forward function 160. Forward function 160 may also be stored in memory 120. To determine a text word from a spoken word, the forward function 160 in the multi-level LM 125 may traverse the prefix tree 150 from a root node to other nodes within prefix tree 150 according to the hypothesized sub-words and accumulate sub-word LM scores using sub-word LM 130 at each step. Each step may be a traversal between two tree nodes in prefix tree 150. In some instances, the forward function 160 may encounter a tree node in the prefix tree 150 containing words whose pronunciations match the sequences of sub-words on the paths stemming from the root. At this point, the forward function 160 may use word LM 140 to output the word or words associated with the tree node. Word LM 140 may also generate word LM scores for the word(s) and replace accumulated sub-word LM scores from sub-word LM 130 with word LM scores from the word LM 140. Subsequently, forward function 160 may move back to the root of the prefix tree 150 to determine the next word in the utterance. A tree node in the prefix tree 150 may contain multiple words when a word is a homophone. When a word boundary is met at a node that includes a homophone word, sub-word LM 130 may output multiple hypothesized words which have different state from the word LM states.

FIG. 2 is a diagram of an algorithm 1 that is a forwarding function, according to aspects of the disclosure. Algorithm 1 may be stored in memory 120 of FIG. 1 (not shown). The multi-level LM 125 shown in FIG. 2 includes a sub-word LM S (sub-word LM 130) and a word LM W (word LM 140). As illustrated in FIG. 2, forward function 160 receives a sub-word s and a previous state (or initial state). First, the forward function 160 determines whether the sub-word s starts with an "\_". An "\_" may indicate that a word boundary in prefix tree 150 is met. If the word boundary is met, sub-word s constitutes a word and forward function 160 proceeds with word LM 140, otherwise, forward function 160 proceeds with sub-word LM 130. The previous state may identify a node in prefix tree 150.

When forward function 160 proceeds with sub-word LM 130, forward function 160 identified if the sub-word s is in a list of sub-words branching out from a current node in prefix tree 150 (shown as function node.getTokens( ) in FIG. 2). The current node may be included in the state. Forward function 160 then identifies a new node in prefix tree 150 that accepts sub-word s (shown as function node.branch(s) in FIG. 2). The new node is a tree node connected to the current node and that is associated with one of the sub-words in the list of sub-words branching out from the current node. Next, forward function may use the function forward (state; s) to traverse to the new node. The function forward (state, s) may receive an input that is a current state and a sub-word s. The function forward(state; s) may return an updated state after accepting sub-word s, a vector of look-ahead scores la_scores for all sub-words in the next step, and word outputs if the word boundary is met. The vector of look-ahead scores la_scores may be based on the scores determined by sub-word LM S and word LM W that is relative to the weight α. The score for sub-word s in la_scores may be determined by sub-word LM S and take into account previous sub-words. When sub-word LM S is not activated, α=0. If the word boundary is not met, the word output may be a special token <incomplete>. The look-ahead scores la_scores may be combined with the acoustic model scores for evaluating partial hypothesis, as will be described below. The forward function 160 may repeat the traversal discussed above unit a word boundary is met.

When forward function 160 proceeds to word LM 140, forward function 160 has identified a word boundary for sub-word s. The word boundary occurs when pronunciation of sub-word s matches the pronunciation of a word at the tree node. In this case, forward function 160 may retrieve a list of complete words associated with the tree node of prefix tree 150 that is associated with state (see function node.get-Words( ) in FIG. 2). Forward function 160 then updates the state and determines a score for the word using word LM M. Forward function 160 also replaces the sub-word score with a word score in the vector of look-ahead scores la_scores. The output of forward function 160 are the list of complete words, the updated state and scores la_scores.

In some embodiments, the state may be a tuple of six elements, shown below:

$$(Sstate; Slogp; Wstate; Wlogp; node; accum)$$

The Sstate may contain the state for a sub-word. Slogp may contain log-probabilities associated with the Sstate for a sub-word s in the sub-word LM S. Forward function 160 may use the log-probabilities to determine the sub-word score with the sub-word LM S. The Wstate may contain the state for a word. Wlogp may contain associated log-probabilities for a word from word LM W. Forward function 160 may use the log-probabilities to determine the word score with word LM W. The node may contain the current position in the prefix tree T (prefix tree 150). Accum may contain an accumulated sub-word score since the last word output.

In some embodiments, at the beginning of the utterance of words, the forward function 160 may initialize the states and log-probabilities by accepting the start of sentence token <sos> and may set node to the root of the prefix tree T:

$$(Sstate; Slogp) \leftarrow S.forward(default\_state; <sos>);$$

$$(Wstate; Wlogp) \leftarrow W.forward(default\_state; <sos>);$$

$$node \leftarrow root; accum \leftarrow 0;$$

Going back to FIG. 1, multi-level LM 125 may be used by ensemble byte pair encoding (BPE) system 165 to determine text words. As discussed above, memory 120 may include an ensemble BPE system 165. The ensemble BPE system 165 may include a phone BPE system 170, a character BPE system 180, and a one-pass beam search algorithm 190. Both phone BPE system 170 and character BPE system 180 use BPE data compression where the most common pair of consecutive tokens of text data are replaced with a new token that does not occur within the original data. In some embodiments, phone BPE system 170 constructs phone BPEs from phone transcription of the speech, such as a spoken word or utterance in a natural language, whereas character BPE system 180 constructs character BPE from a character transcription of the speech. The phone BPEs and character BPEs may be decoded into words or textual representations of the speech. Notably, as will be discussed below, one-pass beam search algorithm 190 in ensemble BPE system 165 may use both phone BPE system 170 and character BPE system 180 to determine a textual representation for the word.

In some embodiments, phone BPE system 170 includes acoustic model (AM) 172 and multi-level LM 174. Character BPE system 180 also includes an AM 182 and multi-level LM 184. AMs 172, 182 may be trained with end-to-end objectives, e.g., the hybrid attention and Connectionist Temporal Classification (CTC) model. AMs 172, 182 may also provide a scoring function which computes the score of the next sub-word given acoustic inputs and previously decoded sub-words, which may be a linear combination of log probabilities from the attention decoder and CTC outputs. Multi-level LMs 174, 184 may be multi-level LM 125 that is trained on text data. Multi-level LMs 174, 184 may be the same instance of multi-level LM 125 or each have different instances of multi-level LM 125. Multi-level LMs 174, 184 may provide the forward function 160 for computing the score of next sub-word given previously decoded words and sub-words.

In ensemble BPE system 165, phone BPE system 170 and character BPE system 180 work together to determine a textual representation of a word. Further phone BPE system 170 and character BPE system 180 may be complementary to each other, i.e. by capturing different aspects of the language. The one-pass beam search algorithm 190 may determine textual representation of a spoken word by traversing an ensemble that includes both phone BPE system 170 and character BPE system 180. For example, one-pass beam search algorithm 190 may use the phone BPE system 170 to propose sub-words up to a word boundary. After phone BPE system 170 identifies a word boundary, the one-pass beam search algorithm 190 may decompose the word into sequence of character BPEs and run the character BPE system 180 to accept the sequence. Next, one-pass beam search algorithm 190 may linearly combine scores from the phone BPE system 170 and character BPE system 180 up to the word boundary. In this way, the phone BPE system 170 may lead the decoding process and the character BPE system 180 may verify the word identified by the phone BPE system 170. This is because the phone BPE system 170 may be more accurate than the character BPE system 180. The phone BPE system 170 and the character BPE system 180 may synchronize at each word boundary. In such a way, the evidence from character BPE system 180 may be injected as early as possible to adjust the scores of word hypothesis. Compared to a conventional second pass rescoring algorithm, the one-pass beam search algorithm 190 may avoid generating and saving large amount of hypothesis by the phone BPE system 170.

FIG. 3 is a diagram 300 of algorithm 2, which one-pass beam search algorithm 190 uses to identify a textual representation for a spoken word, according to an embodiment. Algorithm 2 may be stored in memory 120 of FIG. 1 (not shown). In FIG. 3, phone BPE system 170 is represented as model 1 and character BPE system 180 is represented as model 2. In an embodiment, the one-pass beam search algorithm 190 may maintain a set of decoding beams, e.g. the hypothesis, that represents a hypothetical textural representation for a spoken word. Each beam in the set of beams may be a tuple of eight elements, shown below:

$$(\text{score}, ws, sc1, ys1, st1, sc2, ys2, st2)$$

where score is the final score of the beam for pruning purposes. The ws is the word hypothesis. The sc1 is the score, ys1 is the output sub-word sequence, and st1 is the multi-level LM state from multi-level LM 174 for phone BPE system 170. The sc2 is the score, ys2 is the output word sequence, and st2 is the multi-level LM state from multi-level LM 184 for character BPE system 180.

In some embodiments, parameter $\beta$ may be for combining the LM score from multi-level LM 125 with the AM score from acoustic model 175 within each BPE system (phone BPE system 170 and character BPE system 180). Parameter $\gamma \in [0, 1]$ may be for combining scores from phone BPE system 170 and character BPE system 180.

In some embodiments, the one-pass beam search algorithm 190 may be terminated using a detection method. Notably that one-pass beam search algorithm 190, executes once through the phone BPE sequence in phone BPE system 170 and once through the corresponding character BPE sequence in character BPE system 180. Further, character BPE system 180 does not propose additional hypothesis but simply follows phone BPE system 170. In this way, the time complexity is of Algorithm 2 is roughly the sum of that of individual systems for the same beam size.

As illustrated in FIG. 3, input x may be a spoken word received by the one-pass beam search algorithm 190 which uses the phone BPE system 170 and character BPE system 180 to determine a text representation for the spoken word. The phone BPE system 170 receives the utterance and uses multi-level LM 174 to determine one or more sub-words for the utterance as discussed in FIG. 2 and the scores for the sub-words. AM 172 then receives the input x and determines the score for input x. The combined score for the sub-words is the score from multi-level LM 174 and the score from AM 172. The score from multi-level LM 174 may be adjusted by parameter $\beta$. The process repeats until multi-level LM 174 identifies a word boundary and the one or more sub-words become one or more words.

In some embodiments, once one or more words are identified, one-pass beam search algorithm 190 decomposes the one or more words into characters using the spm-encode (w) function in FIG. 3. The spe-encode function may use an encoder to decompose one or more words into corresponding character sequences. One-pass beam search algorithm 190 then recomputes the one or more words from the character sequences using the character BPE system 180. In character BPE system 180, multi-level LM 184 confirms each word using the corresponding sequence as input and generates a LM score for each word. AM 182 then determines the AM score for each word. For each word, the one-pass beam search algorithm 190 appends the AM score with the LM score in the character BPE system 180. Next, the one-pass beam search algorithm 190 determines a combined score for each word from phone BPE system 170 and character BPE system 180.

In some embodiments, the one-pass beam search algorithm 190 repeats the above process for multiple beams that are the hypothesis for multiple words that may correspond to the utterance, such as a spoken word (input x). Next, one-pass beam search algorithm 190 may select a word that corresponds to a highest score as the text word for the spoken utterance. One-pass beam search algorithm 190 may also select top several highest scores and identify several textual word candidates for the spoken utterance. The highest scores may be the top configurable number of scores or scores that are above a configurable threshold.

Figure 4:
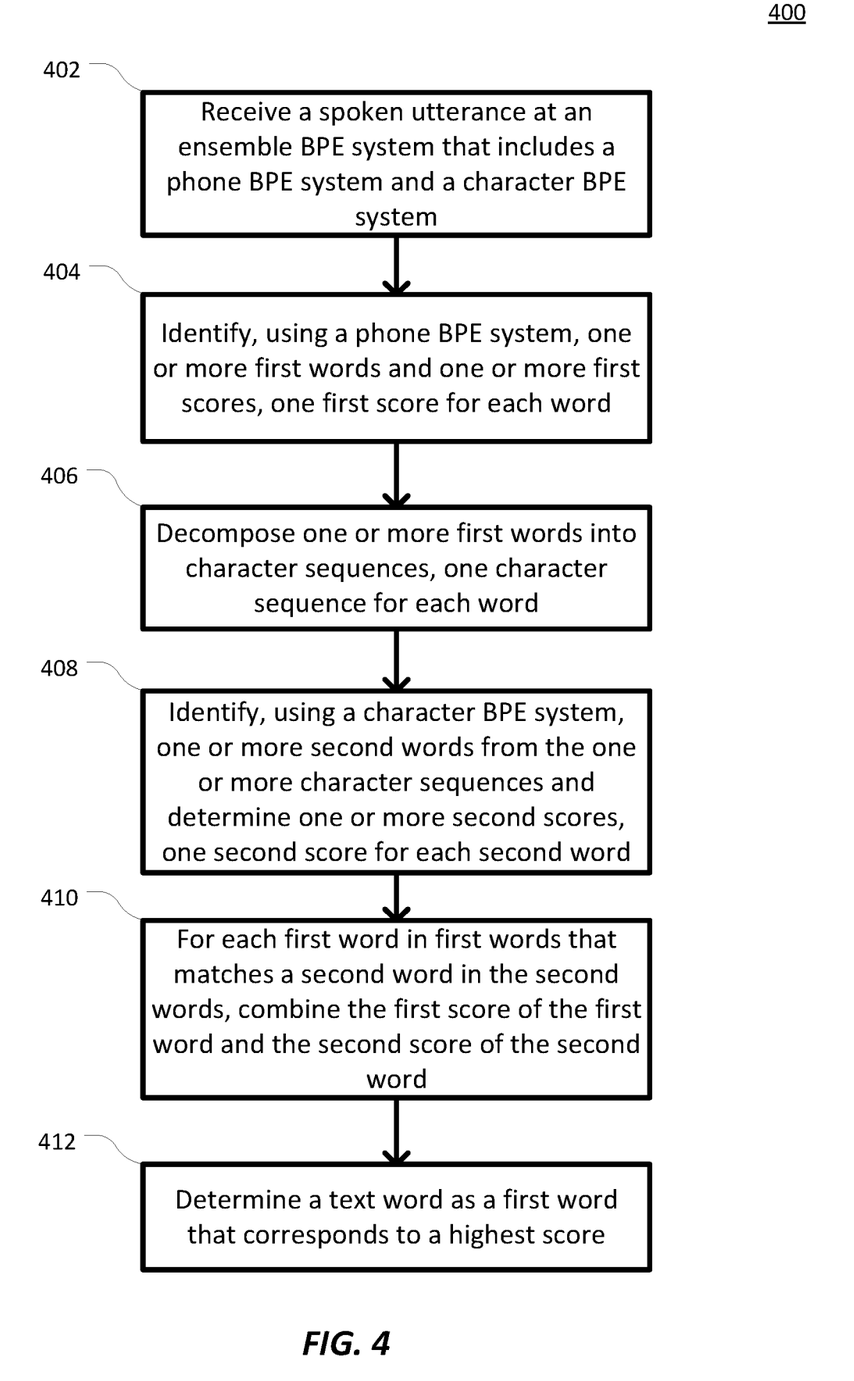
FIG. 4 is a flowchart of a method for converting a spoken utterance into a textual representation of a word, according to some embodiments.

FIG. 4 is a flowchart of a method 400 for translating a spoken utterance into a textual word, according to some embodiments. One or more of the processes 402-412 of method 400 may be implemented, at least in part, in the form of executable code stored on non-transitory, tangible, machine-readable media that when run by one or more processors may cause the one or more processors to perform one or more of the processes 402-412. The processes 402-412 may be performed at each iteration of an epoch that may include a configurable number of iterations.

At process 402, a spoken utterance is received. For example, ensemble BPE system 165 receives a spoken utterance, such as a spoken word, and uses the one-pass beam search algorithm 190 to convert the spoken utterance into a textual representation of the spoken word.

At process 404, one or more words are identified using a phone BPE system 170. One-pass beam search algorithm 190 may identify one or more sub-words and continues until the phone BPE system 170 reaches a word boundary, at which point the one or more sub-words become one or more words. The phone BPE system 170 may also generate scores for the one or more sub-words up to the word boundary at which point the one or more sub-words are converted into one or more words. As discussed above, phone BPE system 170 may use multi-level LM 174 to identify one or more words and both multi-level LM 174 and AM 172 to determine one or more scores for the one or more words.

At process 406, the one or more words are decomposed into a character sequence. For example, one-pass beam search algorithm 190 may convert the one or more words into one or more character sequences, where each sequence includes one or more characters for a corresponding word.

At process 408, one or more words are identified from the character sequences using a character BPE system 180. For example, one-pass beam search algorithm 190 may identify one or more words from the character sequence using character BPE system 180. To identify the one or more words, character BPE system 180 may use multi-level LM 184 to determine sub-words from the characters. The sub-words are then converted to words once a word boundary is met. Multi-level LM 184 may also determine scores for the one or more-sub-words and words. Character BPE system 180 may then use AM 182 to determine scores for the words and combine the scores from the multi-level LM 184 and AM 182 for each word. In this way, the character BPE system 180 may verify the one or more words identified using the phone BPE system 170.

At process 410, scores for each word from the phone BPE system 170 and character BPE system 180 are combined. For example, for each word identified in process 404 that matches a word identified in process 408, one-pass beam search algorithm 190 combines the score for the word from the phone BPE system 170 with the score for the word from the character BPE system 180.

At process 412, a text word is determined from the scores. For example, a word that corresponds to the highest score is determined as the text word.

In some embodiment, multi-level LMs 174, 184 and AMs 172, 182 may have neural network architectures that include an encoder, an attention layer, and a decoder. In some embodiments, an encoder in AMs 172, 182 may be shared by an attention layer and the CTC model. Further the CTC model include convolutional layers, e.g. two convolutional layers. The decoder may include transformer layers, e.g. six transformer layers. In some embodiments, encoder layers of the encoder may employ self-attention and decoder layers in the decoder may employ self-attention to previously encoded labels followed by the source attention to encoder outputs. In some embodiments, the attention operations may use four heads of the sixty-four dimensions each, and the output of multi-head attention layer may go through a one-hidden-layer-position-wise feed forward network of rectifier linear units (ReLU units), e.g. 2048 ReLU units. In another architecture, the decoder may include twenty-four transformer layers and encoder may include twelve transformer layers. Also, there may be ten attention heads that yield an attention dimension that is 384. In this architecture, during training, the attention and feed-forward operations may be randomly skipped with a probability for each layer so that the layer reduces to the identity mapping, and the layer dropout probability linearly increases with depth up to p. In some embodiments, p may be a probability between 0 and 1. The probability may be used to randomly omit the attention operation in a transformer layer, so that the layer reduces to the identity mapping. The probability of that omission is a dropout rate. The rate varies for each layer, and may increase from lower layers, i.e. the layers closer to the input, to the higher layers, i.e. the layers closer to the output. In some embodiments, the rate may be linearly increased from 0 to probability p where the value of p may be set during training. For example, for an encoder or decoder that has five layers and p=0.5, the dropout rate may be 0.1 for the first layer, 0.2 for the second layer, 0.3 for the third layer, 0.4 for the fourth layer, and 0.5 for the fifth layer.

Figure 5:
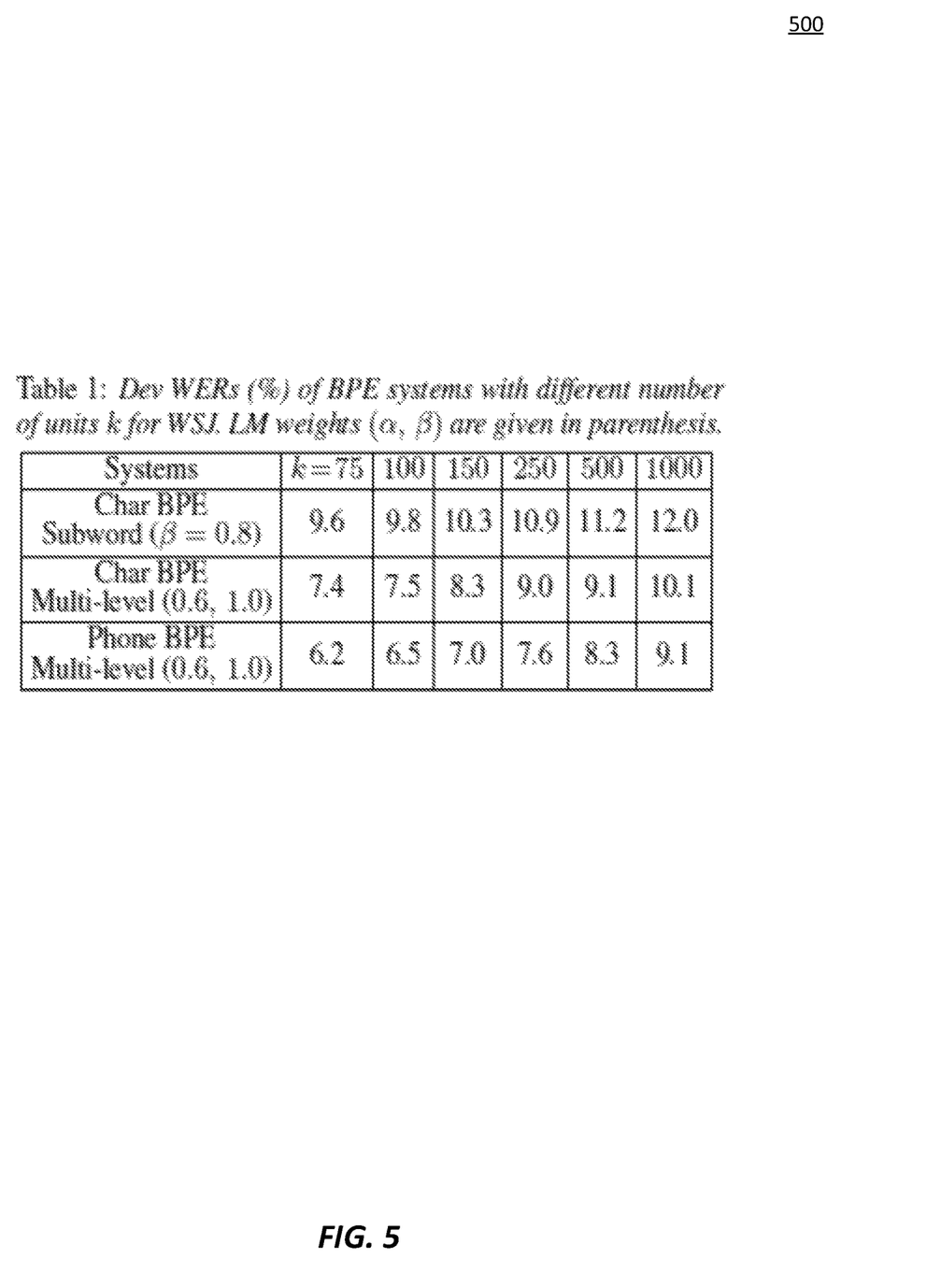
FIG. 5 is a diagram of a table illustrating results of a multi-level character byte pair encoder system and multi-level phone byte pair encoder system over a conventional character byte pair encoder system, according to some embodiments.

FIG. 5 is a diagram 500 illustrating effectiveness of a multi-level language model, according to an embodiment. Diagram 500 illustrates Table 1 that includes results of a conventional character sub-word BPE model, character multi-level BPE model (such as character BPE system 180 that includes multi-level LM 184) and phone multi-level BPE model (such as phone BPE system 170 that includes multi-level LM 174) when trained using a Wall Street Journal (WSJ) dataset. The results are also for a k number of sub-word units. Table 1 illustrates that both character multi-level BPE model and phone multi-level BPE model outperform the conventional character sub-word BPE model for all values of k because both models have a lower word error rate (WER). Further, the phone multi-level BPE model outperforms the character multi-level BPE model.

Figure 6:
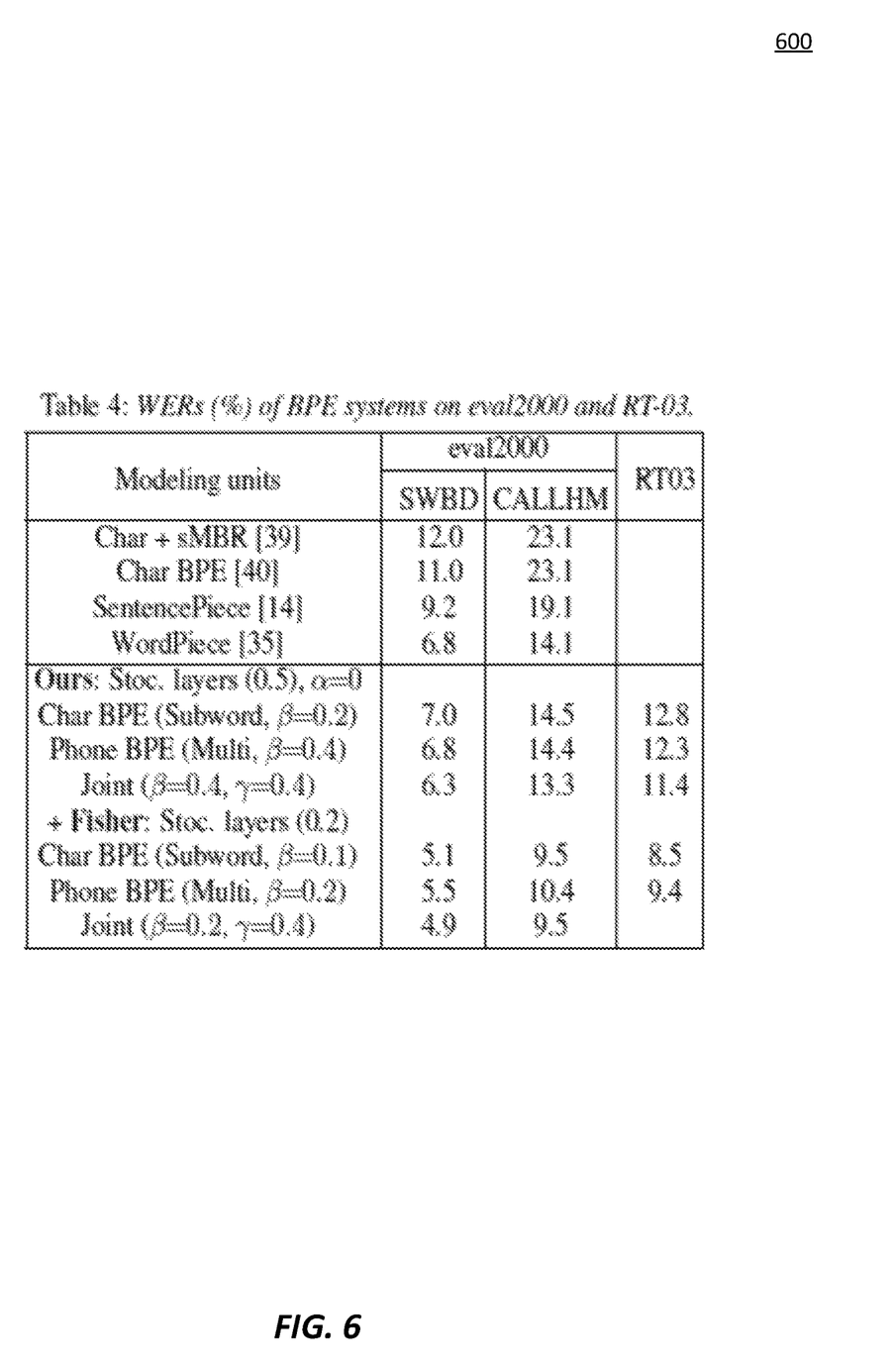
FIG. 6 is a diagram of a table illustrating results of an ensemble byte pair encoder system over conventional speech recognition systems, according to some embodiments.

FIG. 6 is a diagram 600 illustrating effectiveness of an ensemble BPE system over conventional systems, according to an embodiment. FIG. 6 illustrates the WER for various models that translate a spoken word into a textual representation. These models are trained using a Switchboard (SWBD) dataset or CLLHM dataset. Both datasets are part of the Eval2000 dataset. The models are also trained using RT03 dataset. As illustrated in FIG. 6, the joint model (ensemble BPE 165) outperforms both the conventional character sub-word BPE model and phone BPE system 170, as well as conventional models such as Char+sMBR, Char BEP (without multi-level LM 174), SentencePiece, and Word Piece for the SWBD, CLLHM, and RT03 dataset. As also illustrated in FIG. 6, phone BPE system 170 also outperforms the conventional models for SWBD and RT03 datasets.

Some examples of computing devices, such as computing device 100 may include non-transitory, tangible, machine readable media that include executable code that when run by one or more processors (e.g., processor 110) may cause the one or more processors to perform the processes of method 400. Some common forms of machine readable media that may include the processes of method 400 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method for converting a spoken utterance into a text word, comprising:
   receiving the spoken utterance at an ensemble byte pair encoding (BPE) system, wherein the BPE system includes a phone BPE system and a character BPE system;
   identifying one or more first words using the phone BPE system;
   determining a first score for each of the one or more first words;
   converting each of the one or more first words into a character sequence;
   identifying, using the character BPE system, one or more second words from each character sequence;
   determining a second score for each second word;
   for each first word that matches a second word in the one or more second words, combining the first score of the first word and the second score of the second word; and
   determining the text word as a word that corresponds to a highest combined score.

2. The method of claim 1, wherein the identifying the one or more first words further comprising:
   traversing a prefix tree of a language model to identify one or more sub-words until a word boundary is met, wherein the word boundary is met when pronunciation of the one or more sub-words matches pronunciation of the one or more words at a node in the prefix tree; and
   identifying the one or more words at the node in the prefix tree as the first one or more words.

3. The method of claim 2, wherein the language model is a recurrent neural network.

4. The method of claim 1, wherein the phone BPE system includes a multi-level language model that identifies the one or more first words and wherein the multi-level language model includes a sub-word language model and a word language model.

5. The method of claim 4, wherein the phone BPE system includes an acoustic model and further comprising determining the first score for the each of the one or more first words after the multi-level language model identifies the one or more first words.

6. The method of claim 1, wherein the character BPE system includes a multi-level language model and further comprising:
   traversing a prefix tree of the multi-level language model to identify one or more sub-words until a word boundary is met, wherein the word boundary is met when pronunciation of the one or more sub-words matches pronunciation of the one or more words at a node in the prefix tree; and
   identifying the one or more words at the node in the prefix tree as the second one or more words.

7. The method of claim 6, wherein the multi-level language model is a recurrent neural network.

8. The method of claim 6, wherein the character BPE system includes an acoustic model, and further comprising determining the second score for each of the one or more second words after the multi-level language model identifies the one or more second words.

9. A system for converting a spoken utterance into a text word, comprising:
   an ensemble byte pair encoding (BPE) system that includes a phone BPE system and a character BPE system and configured to receiving the spoken utterance;
   the phone BPE system configured to:
      identify one or more first words; and
      determine a first score for each of the one or more first words;
   an encoder configured to convert each of the one or more first words into a character sequence;
   the character BPE system configured to:
      identify one or more second words from each character sequence;
      determine a second score for each second word in the one or more second words; and
      for each first word that matches a second word in the one or more second words, combine the first score of the first word and the second score of the second word; and
   the phone BPE system further configured to determine the text word as a word that corresponds to a highest combined score.

10. The system of claim 9, wherein to identify the one or more first words the phone BPE system is further configured to:
- traverse a prefix tree of a multi-level language model to identify one or more sub-words until a word boundary is met, wherein the word boundary is met when pronunciation of the one or more sub-words matches pronunciation of the one or more words at a node in the prefix tree; and
- identify the one or more words at the node in the prefix tree as the first one or more words.

11. The system of claim 10, wherein the multi-level language model is a recurrent neural network.

12. The system of claim 9, wherein the phone BPE system includes a multi-level language model that identifies the one or more first words, wherein the multi-level language model includes a sub-word language model and a word language model.

13. The system of claim 12, wherein the phone BPE system includes an acoustic model that is configured to determine the first score for each of the one or more first words after the multi-level language model identifies the one or more first words.

14. The system of claim 9, wherein the character BPE system includes a multi-level language model and is further configured to:
- traverse a prefix tree of the multi-level language model to identify one or more sub-words until a word boundary is met, wherein the word boundary is met when pronunciation of the one or more sub-words matches pronunciation of the one or more words at a node in the prefix tree; and
- identify the one or more words at the node in the prefix tree as the second one or more words.

15. The system of claim 14, wherein the multi-level language model is a recurrent neural network.

16. The system of claim 14, wherein the character BPE system includes an acoustic model and the acoustic model is configured to determine the second score for each of the one or more second words after the multi-level language model identifies the one or more second words.

17. A non-transitory machine-readable medium having stored thereon machine-readable instructions executable to cause a machine to perform operations for converting a spoken utterance into a text word, comprising:
- receiving the spoken utterance at an ensemble byte pair encoding (BPE) system, wherein the BPE system includes a phone BPE system that includes at least one first neural network and a character BPE system that includes at least one second neural network;
- identifying one or more first words using the phone BPE system;
- determining a first score for each of the one or more first words;
- converting each of the one or more first words into a character sequence;
- identifying, using the character BPE system, one or more second words from each character sequence;
- determining a second score for each second word;
- for each first word that matches a second word in the one or more second words, combining the first score of the first word and the second score of the second word; and
- determining the text word as a word that corresponds to a highest combined score.

18. The non-transitory machine-readable medium of claim 17, wherein the identifying the one or more first words further causes the machine to perform operations comprising:
- traversing a prefix tree of a multi-level language model to identify one or more sub-words until a word boundary is met, wherein the word boundary is met when pronunciation of the one or more sub-words matches pronunciation of the one or more words at a node in the prefix tree; and
- identifying the one or more words at the node in the prefix tree as the first one or more words.

19. The non-transitory machine-readable medium of claim 18, wherein the phone BPE system includes an acoustic model that determines the first score for each of the one or more first words after the multi-level language model identifies the one or more first words.

20. The non-transitory machine-readable medium of claim 17, wherein the character BPE system includes a multi-level language model and the operation further comprise:
- traversing a prefix tree of the multi-level language model to identify one or more sub-words until a word boundary is met, wherein the word boundary is met when pronunciation of the one or more sub-words matches pronunciation of the one or more words at a node in the prefix tree; and
- identifying the one or more words at the node in the prefix tree as the second one or more words.

* * * * *